Nov. 24, 1925.
R. A. FLUM
CLAMPING DEVICE
Filed Feb. 2, 1924      2 Sheets-Sheet 1
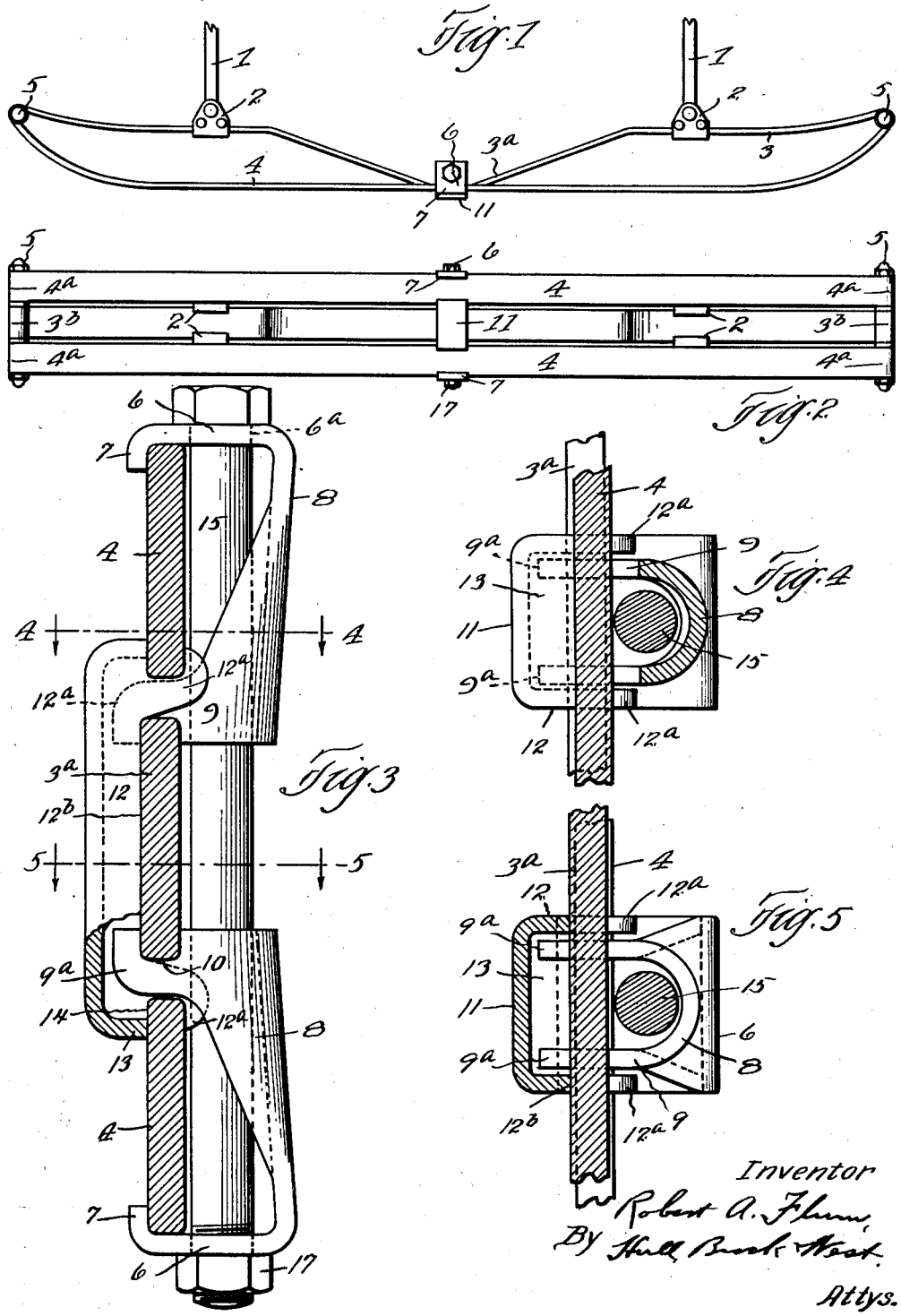

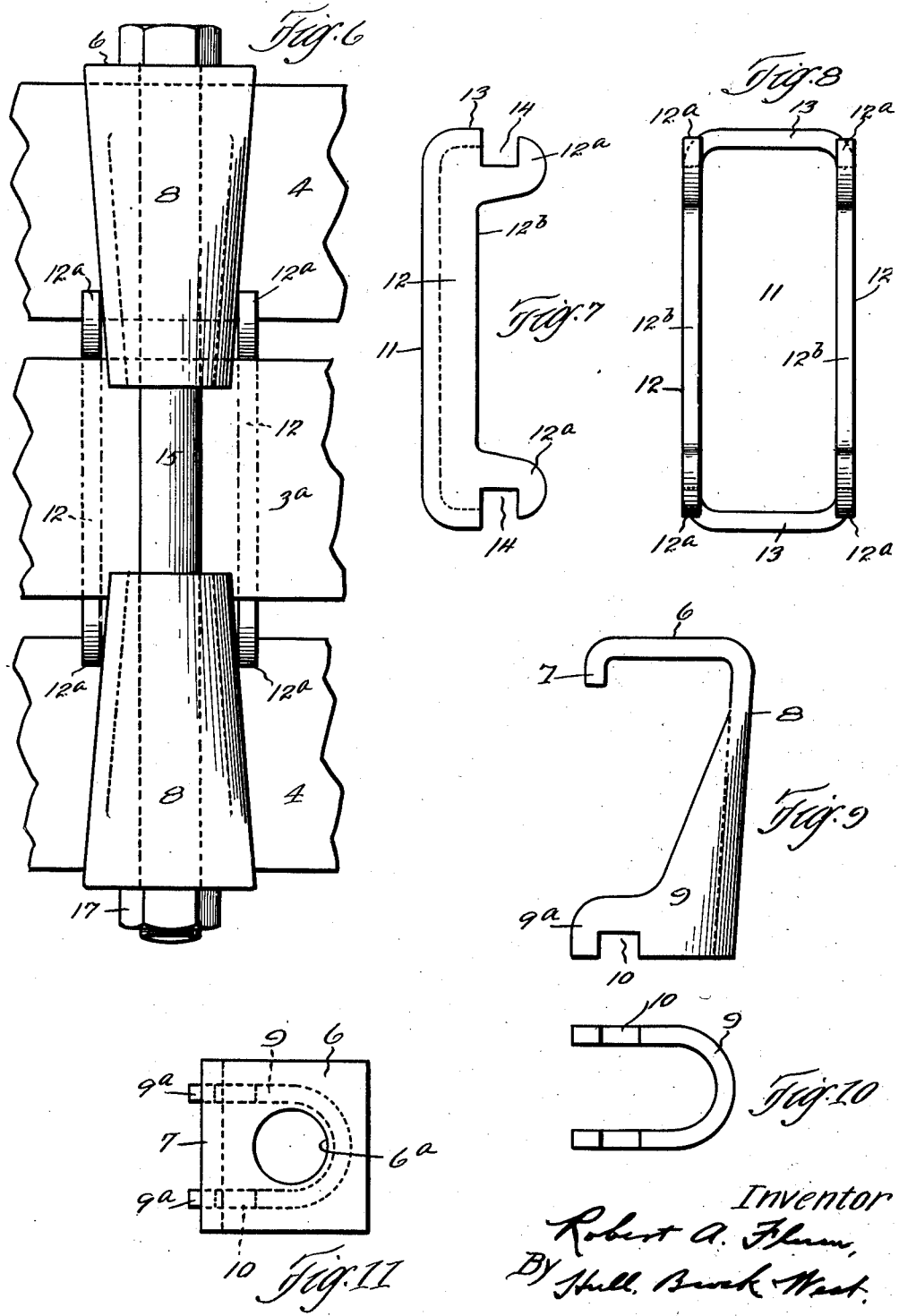

Patented Nov. 24, 1925.

1,562,444

UNITED STATES PATENT OFFICE.

ROBERT A. FLUM, OF KALAMAZOO, MICHIGAN, ASSIGNOR TO THE C. G. SPRING & BUMPER COMPANY, OF DETROIT, MICHIGAN, A CORPORATION OF DELAWARE.

CLAMPING DEVICE.

Application filed February 2, 1924. Serial No. 690,112.

*To all whom it may concern:*

Be it known that I, ROBERT A. FLUM, a citizen of the United States, residing at Kalamazoo, in the county of Kalamazoo and State of Michigan, have invented a certain new and useful Improvement in Clamping Devices, of which the following is a full, clear, and exact description, reference being had to the accompanying drawings.

This invention relates to clamping devices, and more particularly to the devices adapted for clamping the central portion of the rear or auxiliary bar of a bumper to the vertically spaced front or impact bars thereof.

It is the general purpose and object of the invention to provide a clamping device of this character which is simple of construction, which is capable of being readily applied to and removed from cooperating parts of the bumper bars, which will operate efficiently for the purpose for which it is designed, and which is relatively inexpensive of production.

I accomplish the foregoing objects in and through the combinations of elements set forth in the claims hereof.

In the drawings, Fig. 1 represents a plan view of a bumper having my clamping means applied thereto; Fig. 2, a front elevation of such bumper; Fig. 3, a detail in sectional elevation through the central portion of the bumper, the clamping means being shown mainly in elevation; Figs. 4 and 5, sectional details corresponding, respectively, to the lines 4—4 and 5—5 of Fig. 3; Fig. 6, a detail in rear elevation of the central portion of the bumper, showing the clamp; Fig. 7, a side elevation, and Fig. 8 a rear elevation, of the central clamping member; Fig. 9, a side elevation, and Fig. 10 a bottom plan view, of one of the end clamping members; and Fig. 11, a plan view of the clamping device, the bolt being removed.

The clamping device shown herein comprises an upper and a lower clamping member, the said members being identical in construction and interchangeable and each arranged to engage the top of the upper impact bar or the bottom of the lower impact bar and the adjacent edge of the auxiliary bar, and a central or intermediate clamping member which is adapted to engage the bottom of the top bar and the top of the bottom bar and having bearing surfaces adapted to engage the front of the intermediate bar.

Describing the various parts by reference characters, 1, 1 denote a pair of supporting arms adapted to be secured at the rear or inner ends thereof to the side members of an automobile (not shown). Each of these arms is pivotally connected by a clamp 2 to the rear bar of a bumper, said bar having end portions 3 to which the clamps are applied and a central portion 3ª which is projected toward and between the central portions of a pair of front or impact bars 4, 4. The ends of the rear or auxiliary bar are provided each with an eye 3ᵇ which is interposed between eyes 4ª at the ends of the bars 4, the ends of the bars being connected by means of bolts 5 extending through such aligned eyes.

For the purpose of securing the central portions of the bars 3ª and 4 together, I provide an upper and a lower clamping member and an intermediate clamping member. The upper and lower members are identical in construction and may be used interchangeably. Each is provided with a substantially horizontal end portion 6 having an aperture 6ª therethrough and each is provided at one edge with a flange 7 which is adapted to engage the front face of one of the bars 4. The end portion 6 is approximately square, as shown in Fig. 11, and from this end portion extends a rear wall 8, which wall is inclined forwardly toward the end opposed to the portion 6, the sides of such back wall converging toward such opposite end and the said member having forwardly projecting sides 9, each having a notch 10 therein constituting a seat for the adjacent edge of the plate 3ª, the said seats being provided in narrow, forwardly projecting extensions 9ª of the sides, which extensions are adapted to pass between the bar 3ª and either of the bars 4 without engagement with the last-mentioned bars.

Cooperating with the two end members of the clamp is a central member, which member is adapted to extend in front of the central portion of the auxiliary bar and is provided with a pair of upper and a pair of lower seats, the upper seats being adapted to engage the lower edge of the upper bar, on each side of the upper clamping member, while the lower seats are adapted to engage the upper edge of the lower impact bar, on opposite sides of the lower clamping member. As shown in the drawings, this intermediate member comprises a central body 11 which is adapted to extend across the front of the plate 3ª, the said body having side flanges 12 and top and bottom flanges 13 projecting therefrom. Each side flange is provided with an upper and a lower extension 12ª having a notch 14 therein, these notches constituting seats for the edges of the bars 4, 4, and the inner or rear edges 12ᵇ of the flanges being adapted to engage the front face of the bar 3ª.

With the parts constructed and arranged as described, the clamping members can be conveniently applied to the bars 3ª and 4, before the ends of said bars are connected by the bolts 5.

The bars being assembled and the clamping members aligned, a bolt 15 is applied to the upper and lower clamping members, extending through the apertures 6ª thereof. By setting up the nut 17 on this bolt, the upper and lower clamping members are forced toward each other, with the result that the upper and lower edges of the upper and lower bars 4 will be firmly engaged by the portions 6, while the upper and lower edges of the bar 3ª will be firmly engaged by the seats 10 in the parts 9ª. Any tendency of the bars 4, 4 to approach each other is resisted by the seats 14 on the central member; and the result of setting up the nut 17 is to cause the clamping members to engage the three bars firmly and without liability of rattling of the parts of the bumper or of the clamping device. This rattling is also prevented by the engagement of the inner edges of the flanges 12ᵇ against the front face of the intermediate bar and by the engagement of the front and rear faces of the bars 4 with the corresponding walls of the seats formed by the notches 10 and 14.

Having thus described my invention, what I claim is:—

1. A clamping device for bumpers comprising a pair of vertically spaced front or impact bars and a rear or auxiliary bar having its central portion interposed between the central portions of the first two bars, said device comprising upper and lower symmetrical clamping members, each having a seat at one end thereof adapted to engage the upper edge of the upper bar and the upper edge of the lower bar, respectively, and each having a seat at its opposite end for the adjacent edge of the intermediate bar, an intermediate clamping member having laterally spaced seats adapted to receive the lower edge of the upper bar and the upper edge of the lower bar and provided with lateral flanges adapted to engage the front face of said intermediate bar, and a bolt extending through the first two members for securing the same together and to said bars.

2. A clamping device for bumpers comprising a pair of vertically spaced front or impact bars and a rear or auxiliary bar having its central portion interposed between the central portions of the first two bars, said device comprising upper and lower symmetrical clamping members, each having a seat at one end thereof adapted to engage the upper edge of the upper bar and the upper edge of the lower bar, respectively, and each having a seat at its opposite end for the adjacent edge of the intermediate bar, an intermediate clamping member having a seat adapted to receive the lower edge of the upper bar and the upper edge of the lower bar, and means for securing the said members together and to said bars.

3. A clamping device for bumpers comprising vertically spaced impact bars and an auxiliary bar having a portion thereof projected between the said impact bars, the said device comprising an upper and a lower clamping member each having an end provided with a seat adjacent one edge for the upper and the lower edges of the upper and the lower bars, respectively, each of said devices having a forwardly projecting portion at its opposite end adapted to extend between its cooperating impact bar and a portion of the intermediate bar adjacent thereto, each of said forwardly extending portions having a seat for the adjacent edge of such intermediate bar, a central clamping member arranged in front of the intermediate bar and having one or more rearwardly projecting portions each having a seat for the lower edge of the upper bar and for the upper edge of the lower bar, respectively, and a bolt mounted in the first two members for drawing the said members together and for locking the same and the intermediate member to the said bars.

4. A clamping device for bumpers having an upper and a lower impact bar and an auxiliary bar having a portion interposed between the said impact bars, the said device comprising an upper and a lower member each having a body at one end thereof provided with a seat adjacent the front thereof, for the upper and lower edge of the upper and lower impact bars, respectively, and each having at its opposite end a pair of projections extending forwardly between the bar with which said member cooperates and the adjacent edge of the intermediate bar, each of said projections having a seat for the edge of such intermediate bar, a central clamping member comprising a body extending across the front of the intermediate bar and having side flanges adapted to engage such bar and a rearward extension for each end of each side flange, the upper extensions of the flanges projecting between the lower edge of the upper bar and the upper edge of the intermediate bar and the lower extensions projecting between the upper edge of the lower bar and the lower edge of the intermediate bar, each such extension having a seat for the edge of the impact bar adjacent thereto, a bolt extending through the body portions of the upper and lower clamping members, and a nut on said bolt.

5. A clamping device for bumpers having an upper and a lower impact bar and an auxiliary bar having a portion interposed between the said impact bars, the said device comprising an upper and a lower member each having a seat at one end thereof, for the upper and lower edge of the upper and lower impact bars, respectively, and each having at its opposite end a pair of projections extending forwardly between the bar with which said member cooperates and the adjacent edge of the intermediate bar, each of said projections having a seat for the edge of such intermediate bar, a central clamping member comprising a body extending across the front of the intermediate bar and having a rearward extension at each end, the upper extension projecting between the lower edge of the upper bar and the upper edge of the intermediate bar and the lower extension projecting between the upper edge of the lower bar and the lower edge of the intermediate bar, each such extension having a seat for the edge of the impact bar adjacent thereto, and means for securing the said members together and to the said bars.

6. A clamping device for bumpers having a pair of vertically spaced impact bars and an intermediate auxiliary bar, the said device comprising an upper and a lower member, the said members being symmetrical and each having a seat, said seats being adapted to engage the upper edge of the upper impact bar and the lower edge of the lower impact bar, respectively, each member also having a seat adapted to engage the edge of the intermediate bar which is adjacent to the impact bar with which such member cooperates, and means for drawing the said members together, whereby the said members will clamp the edges of the said bars.

7. A clamping device for bumpers having a pair of vertically spaced impact bars and an intermediate auxiliary bar, the said device comprising an intermediate clamping member adapted to bear against one of the faces of the intermediate bar and having seats for the lower edge of the upper impact bar and for the upper edge of the lower impact bar, and an upper and a lower clamping member each having at one end a seat, said seats being for the upper edge of the upper impact bar and the lower edge of the lower impact bar, respectively, and each of the last two members having also a seat adapted to engage respectively the upper edge of the intermediate bar and the lower edge of such bar, and means connecting the last two members for forcing the edges of the bars into engagement with their respective seats.

In testimony whereof, I hereunto affix my signature.

ROBERT A. FLUM.